Feb. 5, 1957 J. M. PESTARINI 2,780,761
VARIABLE SPEED MOTOR SYSTEM
Filed March 18, 1952 2 Sheets-Sheet 1
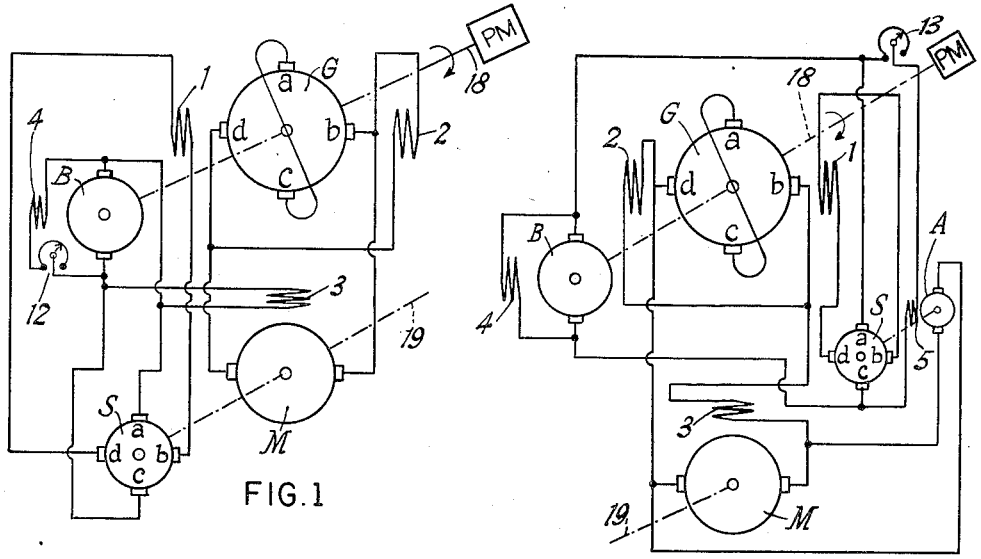
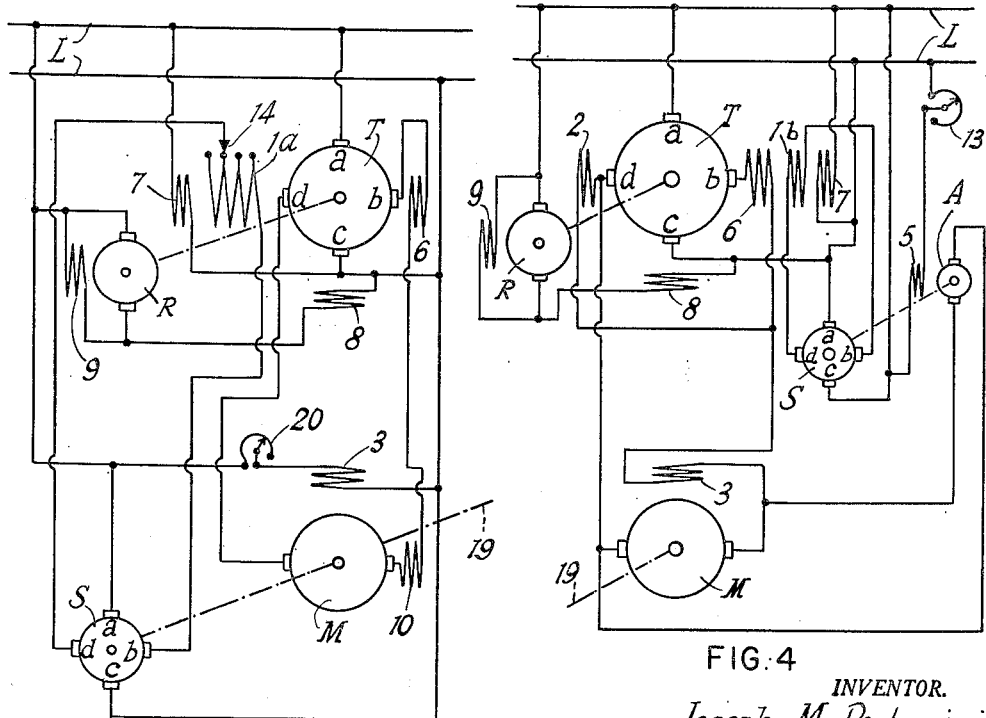
INVENTOR.
Joseph M. Pestarini
BY
Philip G. Hilbert
ATTORNEY Feb. 5, 1957  J. M. PESTARINI  2,780,761
VARIABLE SPEED MOTOR SYSTEM
Filed March 18, 1952  2 Sheets-Sheet 2

INVENTOR.
Joseph M. Pestarini
BY Philip G. Hilbert
ATTORNEY

United States Patent Office 2,780,761
Patented Feb. 5, 1957

2,780,761

VARIABLE SPEED MOTOR SYSTEM

Joseph M. Pestarini, Staten Island, N. Y.

Application March 18, 1952, Serial No. 277,221

9 Claims. (Cl. 318—146)

This invention relates to a system of electrical machines for driving a power shaft at variable speeds.

An object of this invention is to provide a system of machines arranged to automatically vary the speed of an output shaft in response to variations in torque.

Another object of this invention is to provide in a system of the character described, means for controlling the value of the torque.

A further object of this invention is to provide in a system of the character described, means for keeping the power output of the shaft constant and independent of the speed thereof.

Yet another object of this invention is to provide in a system of the character described, means for arbitrarily setting the value of the power supplied by the output shaft.

Still another object of this invention is to provide a system of machines of the character described which are of relatively simple construction, of rugged construction and free of maintenance problems.

The essential components of the system of this invention are special dynamo electric machines of the metadyne type. Such machines have been previously described in French Patents 741,755; 760,337; 773,697; 777,017; 782,185; 786,185; 793,687 and 810,139 as well as in U. S. Patents 1,962,030; 2,112,604; 2,055,240; 1,987,417; 2,038,380; 2,049,389.

A further description of the theory and development of the metadyne is found in the Revue Generale de Electricite of March 8, 15, 1930; August 16, 23, 1930; November 22, 29, 1930 and December 6, 1930.

Figure 5:
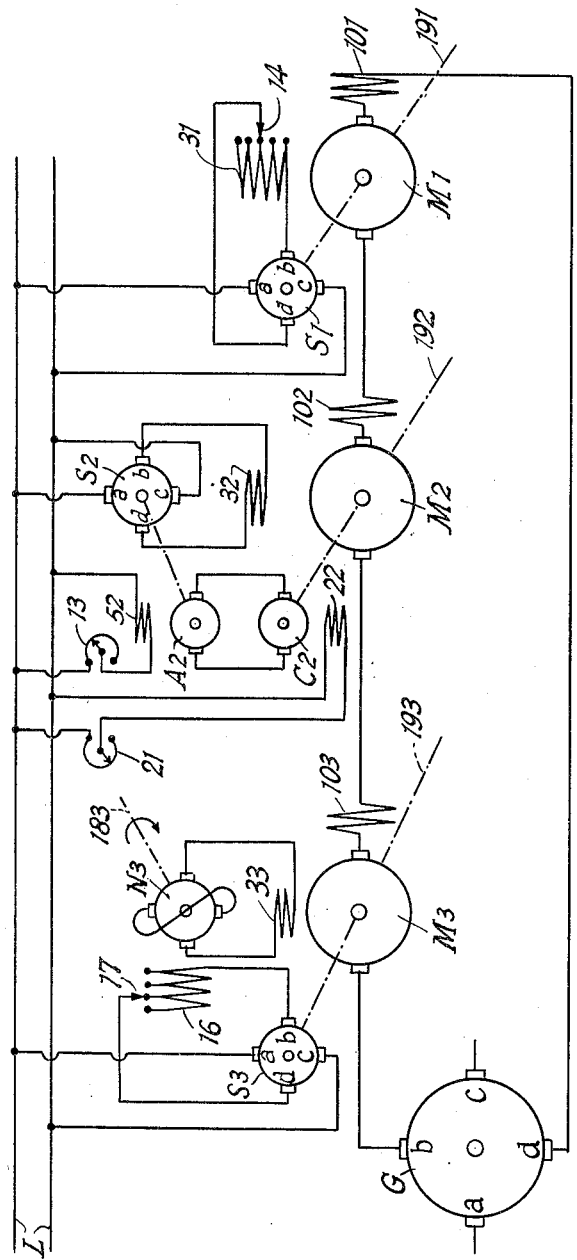
Figure 6:
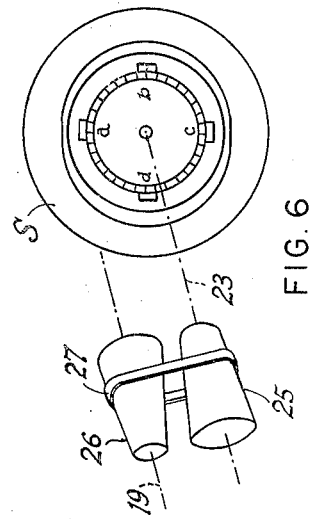

In the drawings: Fig. 1 is a diagrammatic representation of a system embodying the invention and particularly relating to the application thereof to a single, variable speed shaft; Figs. 2, 3 and 4 show modifications thereof; Fig. 5 is a diagrammatic representation of a modified form of the system embodying a plurality of independent, variable speed shafts; and Fig. 6 shows details of one of the compounds of the system.

Referring to the drawings and particularly to Fig. 1, G designates a generator of the metadyne type which comprises an armature having associated therewith a pair of essentially short circuited primary brushes $a$, $c$; a pair of secondary brushes $b$, $d$ and stator windings 1, 2 which have their magnetic axes coincident with the commutating axis of the secondary brushes. M designates a motor rotatable at variable speed and coupled to an output shaft 19.

B designates a generator dynamo having a shunt field winding 4 with a rheostat 12 for regulating the excitation. The generator dynamo B is adapted to supply current at constant voltage and is coupled to generator metadyne G which is adapted to supply constant current, the generator G being driven through shaft 18 at constant speed by a prime mover PM. S designates a special rotary transformer of the metadyne type which is coupled to motor M.

The output of generator G is supplied to motor M through the secondary brushes $b$, $d$. The stator winding 2 is shunt connected across secondary brushes $b$, $d$ of the generator while the stator winding 1 is connected to secondary brushes $b$, $d$ of the special transformer metadyne S. The primary brushes $a$, $c$ of the metadyne S are connected to the generator dynamo B, which is also connected to the field control winding 3 of motor M.

The system shown in Fig. 1, operates as follows: Since the generator dynamo B supplies current at constant voltage, the field excitation of motor M is constant. Constant voltage is also impressed on the primary brushes of the transformer metadyne S. As metadyne S has no stator windings, the secondary current traversing brushes $b$, $d$ thereof, must create the flux necessary for inducing between the primary brushes $a$, $c$ thereof, the counterelectromotive force equal to the constant voltage applied to said primary brushes by the dynamo B. As the electromotive force induced between the primary brushes of metadyne S is proportional to the rotational speed thereof and to the flux created by said secondary brushes, the flux must be inversely proportional to the speed of metadyne S which is coupled to motor M. Under such conditions, metadyne S supplies at its secondary brushes $b$, $d$, an output current which is inversely proportional to the speed of shaft 19. Such output current traverses stator winding 1 of the generator metadyne G causing the same to supply through its secondary brushes $b$, $d$, an output current which is also inversely proportional to the speed of shaft 19. Accordingly the torque developed by motor M is inversely proportional to its speed and the corresponding mechanical power is constant.

Stator winding 2 creates ampere turns which provide an electromotive force equal to the internal voltage drop of the generator metadyne G, thus causing the secondary current supplied by metadyne G to be exactly proportional to the current supplied by the special transformer metadyne S and therefore to be exactly inversely proportional to the speed of shaft 19.

For controlling the value of the constant mechanical power supplied by output shaft 19, the voltage of the generator dynamo B may be varied by suitable regulation of rheostat 12. The secondary current supplied by the transformer metadyne S is proportional to the voltage impressed on its primary brushes. The value of the voltage impressed on brushes $a$, $c$ of metadyne S may be controlled by other suitable means. For the same purpose, the gear ratio of the coupling between metadyne S and shaft 19, may be modified.

The system shown in Fig. 2, shows the same components as in Fig. 1, with the addition of an auxiliary dynamo A having a field control winding 5. Special transformer metadyne S is now coupled to dynamo A whose armature is shunt connected to the brushes of motor M and whose field winding 5 is energized by dynamo B and controlled by rheostat 13. Field winding 3 of motor M is connected between the motor armature and secondary brush $b$ of generator metadyne G, thus providing substantially series excitation, since the current absorbed by dynamo A is comparatively small. The connections of metadyne G, dynamo B and transformer metadyne S are otherwise the same as shown in Fig. 1.

In operation, the voltage supplied to transformer metadyne S by generator dynamo B, is constant, as is the voltage supplied to field winding 5. The metadyne S, having no stator windings, functions in the manner described above. Accordingly, the speed of dynamo A and metadyne S coupled thereto, is proportional to the voltage between the brushes of motor M and the current supplied by transformer metadyne S to stator winding 1 is inversely proportional to the brush voltage of motor M. Thus, the secondary or output current supplied by metadyne G to motor M is inversely proportional to the brush voltage of the motor and the mechanical power supplied by shaft 19 is constant.

For controlling the value of the constant mechanical power supplied by output shaft 19, the voltage impressed on the primary brushes a, c of the transformer metadyne S may be suitably regulated. Alternatively, the ratio between the brush voltage of the motor M and the speed of dynamo A, may be varied through operation of rheostat 13, for the same purpose.

It is understood that the metadyne generator G may be replaced by other sources of controllable constant current and the generator dynamo B may be replaced by other suitable sources of controllable constant voltage.

In Fig. 3 is shown a system illustrating a modified form of the invention. Here, direct current power lines L provide a constant voltage. A transformer metadyne T has its primary brushes a, c connected to line L, the metadyne including stator windings 1a, 6 and 7 which have their magnetic axes coincident with the commutating axis of the secondary brushes b, d, and further including a stator winding 8 whose magnetic axis is coincident with the commutatiing axis of the primary brushes a, c. A speed regulator dynamo R, having a shunt field winding 9 is coupled to the transformer metadyne T. A special transformer metadyne S is coupled to motor M which drives the variable speed shaft 19, as described in connection with Fig. 1.

The motor M includes field control winding 3 which is connected across power lines L, with a rheostat 20 controlling the input and a compensating winding 10 series connected in the motor armature circuit which is connected to the secondary brushes b, d of the transformer metadyne T. The special transformer metadyne S has its primary brushes a, c connected to the power line L and its secondary brushes b, d connected to stator winding 1a which has a variable tap 14.

The regulator dynamo R is connected to stator winding 8 and to the power lines L. As more specifically described in applicant's Patent 2,055,240, the regulator dynamo R supplies a regulator current to winding 8, thereby keeping the rotational speed of the transformer metadyne T constant independently of the load and the voltage fluctuations of power lines L. Stator winding 7 is shunt connected to lines L and the primary brushes a, c of the metadyne T and provides an electromotive force equal to the line voltage. Under such conditions the secondary current of the metadyne transformer T is exactly proportional to the current traversing stator winding 1a. Stator winding 6, series connected in the secondary brush circuit, provides compensations or under compensation and allows for a reduction in the secondary current supplied by special transformer metadyne S which is necessary for creating the secondary current of the transformer metadyne T. Compensating winding 10 provides for better control of the system.

The operation of the system shown in Fig. 3, is similar to that of Fig. 1. Here, the special transformer metadyne S supplies a current inversely proportional to the speed of shaft 19, to the stator winding 1a and causes transformer metadyne T to supply to motor M a current inversely proportional to the speed of shaft 19. As the field excitation of motor M is constant, the torque developed by the motor is inversely proportional to its speed and therefore, the mechanical power of output shaft 19 is constant. The value of the power of shaft 19 is controlled through the operation of rheostat 20 which modifies the excitation of motor M and through a modification of the ratio of the intensities of the secondary currents of metadynes S and T by means of the tap 14 which may regulate the active turns of stator winding 1a.

In Fig. 4, is shown a system somewhat similar to that of Fig. 2, with transformer metadyne T and constant voltage direct current lines L, replacing generator metadyne G. The metadyne T includes a stator winding 8 in circuit with a regulator dynamo R, as described in connection with Fig. 3 and stator windings 1b, 2, 6 and 7. The primary brushes a, c of the metadyne T are connected to lines L while the secondary brushes b, d thereof are connected to the series excited motor M.

The special transformer metadyne S has its primary brushes a, c connected to lines L and its secondary brushes b, d connected to stator winding 1b. Auxiliary dynamo A is coupled to metadyne S and connected to motor M, its field control winding 5 being connected to the lines L through rheostat 13.

The stator windings 1b, 2, 6 and 7 function in the manner of their counterparts described in connection with Figs. 1–3. The speed of machines A and S is proportional to the brush voltage of motor M, accordingly, the secondary current of machine S and of machine T is inversely proportional to the brush voltage of motor M. Thus, motor M absorbs a constant electric power and shaft 19 supplies constant mechanical power independently of its speed.

The value of the constant power output of shaft 19 may be regulated by means referred to in connection with Figs. 1–3, and may also be regulated by means of rheostat 13. It is understood that the transformer metadynes T shown in Figs. 3, 4, may be replaced by other suitable means adapted to supply a controllable constant current.

In the systems shown in Figs. 1–4, the special transformer metadyne S controls the intensity of the current supplied to the armature of motor M. In the system shown in Fig. 5, the metadynes S1, S2, S3, which are similar to metadyne S, are adapted to control the intensity of the current supplied to the excitation windings of motors M1, M2, M3, respectively associated therewith, while the respective armatures thereof are supplied with constant current. With such arrangement, constant current derived from a single generator or transformer metadyne, may be supplied to the armatures of a plurality of independently operating, variable speed motors.

In Fig. 5, a generator metadyne G similar to that shown in Figs. 1 and 2, the control windings being omitted for convenience in illustration, has its secondary brushes b, d connected to the series connected variable speed motors M1, M2, M3 which include series compensating windings 101, 102, 103, respectively. The generator metadyne G may be replaced by a transformer metadyne or other suitable source of constant current.

The excitation control winding 31 of motor M1 is energized by the output of special transformer metadyne S1 whose input is connected to a constant voltage direct current line L. The metadyne S1 is coupled to the motor so that the field excitation thereof is inversely proportional to its speed and the torque of motor M1 is inversely proportional to its speed and the mechanical power supplied is constant. The field winding 31 may be tapped and through variable contact 14, the active turns of the winding may be varied to effect a control on the power output of shaft 191 on motor M1. Control may also be obtained by varying the voltage impressed on the primary brushes a, c of special transformer metadyne S1 and by modifying the gear ratio of the coupling between motor M1 and metadyne S1.

In the case of motor M2, its excitation control winding 32 is supplied with current from the secondary brushes b, d of special transformer metadyne S2 whose primary brushes a, c are connected to line L. The metadyne S2 is mechanically coupled to an auxiliary dynamo A2 whose armature is energized by a tachometer dynamo C2. The excitation windings 52, 22 of machines A2, C2, respectively, are energized by the line L, through rheostats 13, 21, respectively. Thus, the voltage impressed on dynamo A2 and hence the speed of the dynamo and coupled machine S2, is proportional to the speed of the output shaft 192 of motor M2. Under such conditions, the secondary current of metadyne S2 is inversely proportional to the speed of shaft 192 and therefore, the torque developed by motor M2 is inversely proportional to its speed and the mechanical power developed is constant. Through regulation of rheostats 13, 21, the value of the mechanical power output may be controlled.

Motor M3 is mechanically coupled to special transformer metadyne S3 whose primary brushes $a$, $c$ are connected to line L and whose secondary brushes $b$, $d$ supply current to a tapped stator winding 16 of an amplifier metadyne N3. The metadyne N3 includes a pair of essentially short circuited brushes and a second pair of brushes connected to the excitation control winding 33 of motor M3. The amplifier metadyne N3 which is rotated through shaft 183 by suitable means, not shown, is more fully described in Patent 2,112,604. The field excitation of motor M3 is inversely proportional to the motor speed and the power supplied by output shaft 193 is constant. Special transformer metadyne S3 supplies its output current to the stator winding 16 of amplifier metadyne N3, the active turns of the winding being regulated by means of contact 17, thereby controlling the value of the power supplied by shaft 193. It is understood that the output current of the other special transformer metadynes S, S1 and S2 may be similarly amplified before supply to the motor armature or field winding.

It has been found that the ratio of the secondary current output to the primary current input of the special transformer metadynes S, S1, S2, S3, increases for a predetermined rotational speed of the metadyne, when the air gap between the rotor and stator of the metadyne is made nonuniform, as shown in Fig. 6. Thus, the transverse dimension of the air gap along the commutating axis of the secondary brushes $b$, $d$ is made greater than that along the commutating axis of the primary brushes $a$, $c$, by suitably machining the interior surface of the stator element.

Fig. 6 also shows means for varying the mechanical coupling between the special transformer metadyne S and shaft 19, using cone pulleys 25, 26 which are connected by a displaceable belt 27, through which the gear ratio may be varied. Other types of gear ratio controls may be used.

The special transformer metadynes S, S1, S2 and S3 are rotating electric machines which comprise a commutator provided with a set of primary brushes and a set of secondary brushes. Such a machine has no stator windings and the stator element comprises essentially a magnetic ring member for completing the magnetic circuit.

It will be apparent that there has been provided improved systems for regulating and controlling the output shaft of one or more variable speed motors, using special transformer metadynes whose speed is correlated to that of the motors.

As various possible embodiments might be made of the above described invention, and as various changes might be made in the embodiments set forth, it is understood that all matter herein set forth or shown in the accompanying drawings, is to be interpreted as illustrative and not in a limiting sense.

Having thus described my invention, I claim as new and desire to protect by Letters Patent:

1. A system comprising a variable speed motor, a source of constant voltage direct current, a transformer metadyne having its input connected to said current source and its output connected to said motor, said metadyne including a regulator stator winding and a variable control stator winding, a speed regulator dynamo coupled to said metadyne and in circuit with said regulator winding and said current source, a second transformer metadyne coupled to said motor and having its input in circuit with said current source and its output in circuit with said variable control winding whereby the current supplied to said motor is inversely proportional to the motor speed.

2. A power system comprising a variable speed motor including a control winding, a dynamoelectric machine for energizing said motor and including a control winding, a transformer metadyne including a pair of primary brushes and a pair of secondary brushes, a constant voltage direct current source in circuit with said primary brushes, circuit means connecting said secondary brushes to one of said control windings, the current traversing the secondary brushes being operative to create a flux inducing between the primary brushes a counterelectromotive force equal to the voltage of said direct current source whereby the power of said motor remains constant independently of the speed thereof.

3. A system as in claim 2 wherein the air gap of said transformer metadyne is greater at its secondary commutating axis than at its primary commutating axis.

4. A power system as in claim 2, wherein the control winding of said dynamoelectric machine is in circuit with said secondary brushes, said transformer metadyne being coupled to said motor.

5. A power system as in claim 2, wherein the control winding of said dynamoelectric machine is in circuit with said secondary brushes, and further including a dynamo shunt connected to the armature of said motor, said dynamo including an excitation winding in circuit with said direct current source, said dynamo being coupled to said transformer metadyne.

6. A power system as in claim 2 wherein the output of said secondary brushes is supplied to the control winding of said motor and said dynamoelectric machine supplies constant current to the armature of said motor.

7. A power system as in claim 6 wherein said transformer metadyne is coupled to said motor.

8. A power system as in claim 6 and further including means directly responsive to the rotational speed of said motor for rotating said transformer metadyne.

9. A power system as in claim 2 wherein said dynamoelectric machine supplies constant current to the armature of said motor.

References Cited in the file of this patent
UNITED STATES PATENTS

| Number | Name | Date |
| --- | --- | --- |
| 533,247 | Stienmetz | Jan. 29, 1895 |
| 1,480,709 | Fortescue | Jan. 15, 1924 |
| 2,038,384 | Pestarini | Apr. 21, 1936 |
| 2,060,672 | Heyman | Nov. 10, 1936 |
| 2,323,741 | Watson | July 6, 1943 |
| 2,537,794 | Shaad et al. | Jan. 9, 1951 |
| 2,575,717 | King | Nov. 20, 1951 |
| 2,590,120 | Pestarini | Mar. 25, 1952 |
| 2,607,908 | Edwards et al. | Aug. 19, 1952 |
| 2,632,140 | Pestarini | Mar. 17, 1953 |
| 2,660,699 | Helot | Nov. 24, 1953 |